United States Patent [19]

Gerondale et al.

[11] Patent Number: 4,763,365
[45] Date of Patent: Aug. 16, 1988

[54] SPA SYSTEM HAVING HIGH TEMPERATURE SAFETY DEVICE

[75] Inventors: Joe Gerondale; Jack Rainwater, both of Santa Ana, Calif.

[73] Assignee: Tolo, Inc., Santa Ana, Calif.

[21] Appl. No.: 38,500

[22] Filed: Apr. 15, 1987

[51] Int. Cl.$^4$ ............................................... A47K 3/02
[52] U.S. Cl. ........................................ 4/542; 324/509; 324/510; 361/42; 361/45; 361/47; 219/306; 219/308
[58] Field of Search ................... 4/542, 544, 545, 546, 4/538; 324/509, 510; 361/25, 47, 42, 45, 49, 103, 105; 236/23, 24; 219/296, 308, 309, 328, 331, 306; 128/66; 340/650, 649

[56] References Cited

U.S. PATENT DOCUMENTS

| | | | |
|---|---|---|---|
| 3,455,299 | 7/1969 | Gerow | 4/544 |
| 4,344,100 | 8/1982 | Davidson et al. | 361/45 |
| 4,389,692 | 6/1983 | Sander et al. | 361/105 |
| 4,410,924 | 10/1983 | Hewitt et al. | 361/25 |
| 4,595,825 | 6/1986 | Gordbegli | 219/308 |

FOREIGN PATENT DOCUMENTS

| | | | |
|---|---|---|---|
| 3114788 | 10/1982 | Fed. Rep. of Germany | 236/24 |
| 3110170 | 10/1982 | Fed. Rep. of Germany | 236/24 |
| 3110169 | 11/1982 | Fed. Rep. of Germany | 236/24 |

*Primary Examiner*—Henry J. Recla
*Assistant Examiner*—L. J. Peters
*Attorney, Agent, or Firm*—Louis J. Bachand

[57] ABSTRACT

A ground fault simulation is produced responsive to a pool or spa water overtemperature condition, tripping the ground fault interrupter and shutting down the pump used to recirculate the water.

11 Claims, 2 Drawing Sheets

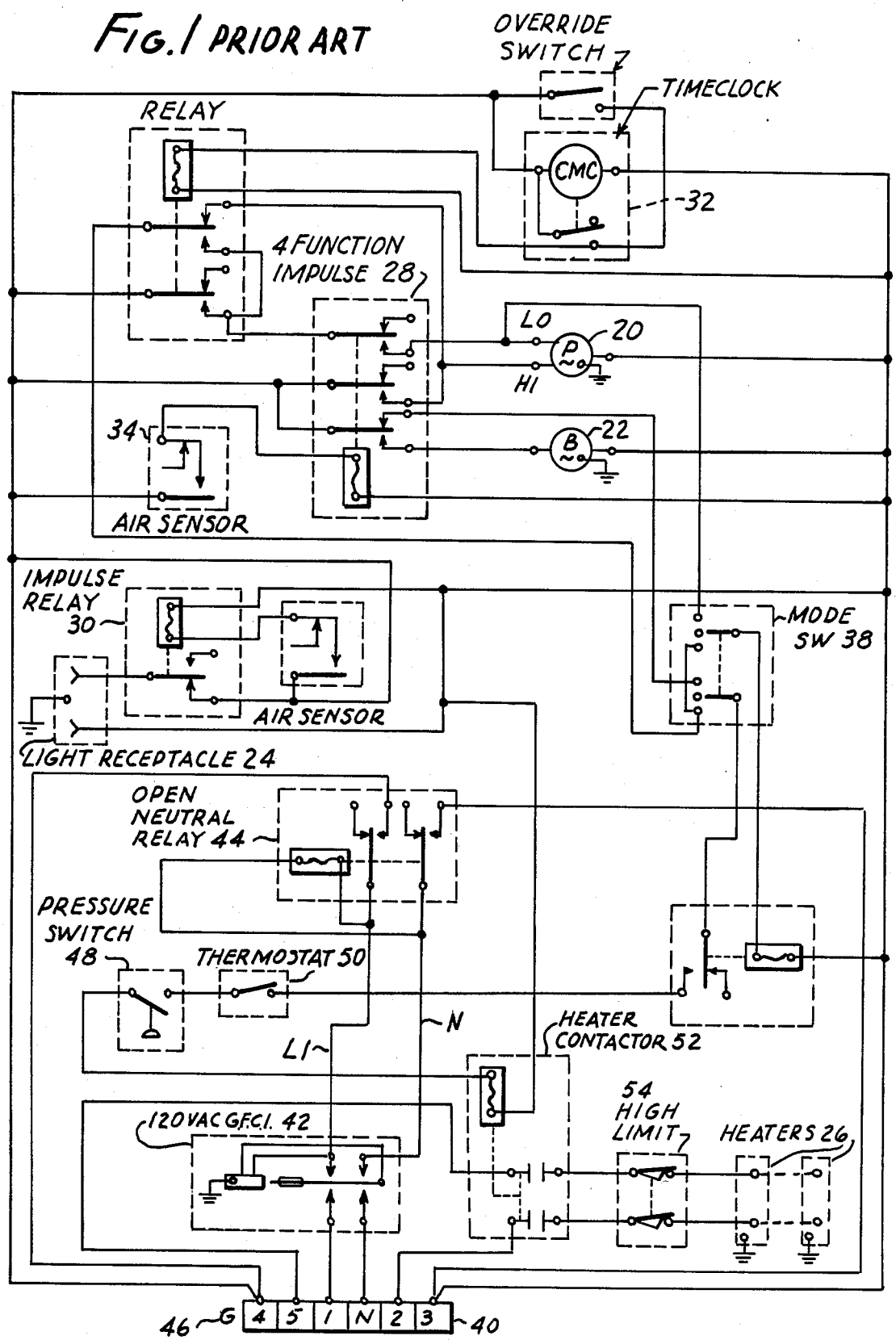

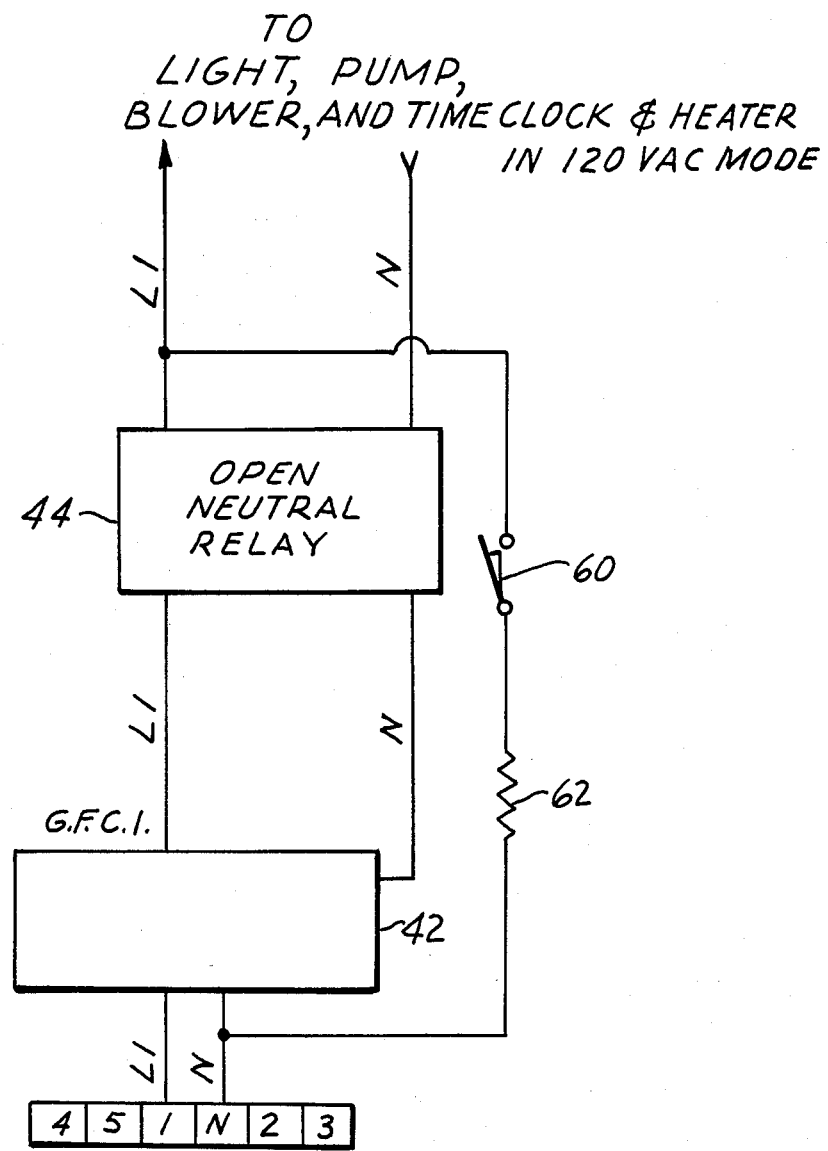

SPA SYSTEM HAVING HIGH TEMPERATURE SAFETY DEVICE

TECHNICAL FIELD

This invention has to do with improvements in spa and pool safety and is particularly concerned with preventing overtemperature conditions in the recirculating water such as can occur from convention heating of the water by the water pump even after the heater has shut down.

BACKGROUND

Spas primarily but also pools have water recirculation systems which operate at high speeds to massage the body and to continually reheat the circulating water. Accidents can occur when the water temperature reaches too high a level, for example hyperthermia and death may result from too long an exposure to too high a temperature of water. Heaters typically are equipped with flow sensing and high temperature limit switches which shut down the heater when there is no water flow and when the heater, usually sensed at the housing, has reached a preset maximum temperature indicative of the onset of too hot water coming from the heater.

Pumps used to recirculate the water are also sources of heat particularly at the high circulation speeds preferred by spa users. But at present there is no way to monitor the undue input of heat into the water from the pump or to stop its buildup automatically. Thus dangerous water temperatures may occur although the heater has shut down.

SUMMARY OF THE INVENTION

It is an object therefore of the invention to provide for the automatic shutdown of recirculating water in spa and pool installations in the event the pump is adding undue amounts of heat to the water. It is another object to sense the temperature of recirculating water and signal an excess temperature to the circuitry controlling the pump, so that the pump shuts down. It is a highly specific object to utilize the ground fault circuit interrupter universally present spa and pool water recirculating systems to effect the electrical disconnect of the pump, by simulating a ground fault as a function of a sensed high temperature.

These and other objects of the invention to become apparent hereinafter are realized in a pool or spa water heating system having an electrical power supply and in which water is continually recirculated by an electrically controlled pump through a heater under conditions allowing convectional heating of the water by the pump, the system having a ground fault circuit interrupter operatively connected to the pump electrical control, by provision of the improvement comprising means simulating a ground fault to the interrupter responsive to a sensed overtemperature condition in the recirculating water for electrically disconnecting the pump and blocking pump heating of the water by activation of the fault interrupter.

In preferred modes there is also included: signaling means arranged to sense a overtemperature condition and signal the condition, and trip means responsive to the signal to cause a flow of current from the power supply sufficient to cause the fault interrupter to disconnect the pump from the power supply and discontinue water circulation; the power supply comprises a power line having a first power conductor and a neutral power conductor; the signaling means comprises a thermostatic switch in sensing relationship to the recirculating water and adapted to cause an electrical connection between its two poles in response to a sensed overtemperature condition; there is also a trip means and the power supply includes a first power conductor and a neutral line, the fault interrupter acting to disconnect the pump from the first power conductor responsive to a predetermined imbalance in the current flowing from the first conductor and through the neutral line occurring; the trip means comprising a simulated fault current means drawing at least a minimum amount of current sufficient to effect the predetermined imbalance and cause the fault interrupter to disconnect the pump from the first power conductor; and the ground fault simulating means comprises a resistor for resisting the flow of electrical current, the resistor being interconnected in series between the poles of the thermostatic switch and between the first power conductor and the neutral power conductor in a manner that when the thermostatic switch shorts between its two poles, the fault interrupter disconnects the pump from the first power conductor.

Typically the device includes signaling means arranged to sense a overtemperature condition and signal the condition, and trip means responsive to the signal to cause a flow of current from the power supply sufficient to cause the fault interrupter to disconnect the pump from the power supply and discontinue water circulation, the trip means comprising a simulated fault current means drawing at least a minimum amount of current sufficient to effect a current imbalance and cause the fault interrupter to disconnect the pump from the power supply, the power supply comprising a power line having a first power conductor and a neutral power conductor, the signaling means comprising a thermostatic switch in sensing relationship to the recirculating water and adapted to cause an electrical connection between its two poles in response to a sensed overtemperature condition, the power supply including a first power conductor and a neutral line, the fault interrupter acting to disconnect the pump from the first power conductor responsive to a predetermined imbalance in the current flowing from the first conductor and through the neutral line occurring; the trip means comprising a simulated fault current means drawing at least a minumum amount of current sufficient to effect the predetermined imbalance and cause the fault interrupter to disconnect the pump from the first power conductor, and the ground fault simulating means comprises a resistor for resisting the flow of electrical current, the resistor being interconnected in series between the poles of the thermostatic switch and between the first power conductor and the neutral power conductor in a manner such that when the thermostatic switch shorts between its two poles, the fault interrupter disconnects the pump from the first power conductor.

THE DRAWING

The invention will be further described in conjunction with the attached drawing in which:

FIG. 1 is an electronic schematic drawing of a conventional spa control circuit.

FIG. 2 is a schematic drawing of a portion of the FIG. 1 wherein the preferred embodiment of the present invention is installed.

PREFERRED MODES

Referring now to FIG. 1, a conventional circuit for a spa or swimming pool controller is schematically shown. The circuit of FIG. 1 provides electrical control for a water pump 20, an air blower 22, an electric light 24 and electric heaters 26. User control is through impulse switches 28 and 30 which allow the user to selectively turn off and on pump 20, blower 22, light 24 and heaters 26. Impulse switches 28 and 30 are each typically comprised of a long tube with an air pump (not shown) attached to one side of the tube nearest the spa (also not shown) and the other side attached to one of the air sensor switches 34 and 36. When the user pushes one of the air pumps it causes either impulse switch 28 or 30 to switch its respective controlled device. The circuit of FIG. 1 also includes a time clock control 32 to turn on and off the heaters 26 and other devices at a desired time.

The circuit of FIG. 1 typically operates on conventional United States standard power lines carrying 110 to 120 volts AC and/or 220 to 240 volts AC. Mode switch 38 must be selected for operation with 120 volts, 240 volts or a combination of the two. The power line input to the circuit of FIG. 1 is taken via bus 40 and some of the typical input wirings to bus 40 are shown, including a combination of a 120 volt source and a 240 volt source, each with a common neutral.

The circuit of FIG. 1 also offers protection against ground faults which may electrocute a user, the protection comprising a 120 volt ground fault control interrupter ("G.F.C.I.") 42 and open neutral relay 44. The G.F.C.I. 42 is of the type which senses an imbalance in the current flowing through line L1 and returning to the neutral (designated "N" in the figure). If more than 5 milliamps of current flows from line L1 but does not return via the neutral line (N) from the G.F.C.I. 42, the G.F.C.I. will cause open neutral relay 44 to open lines L1 and the neutral line, thus cutting off current to prevent electrical shock to a spa user. The shutting off of the current also cuts off the pump 20, the blower 22 and the light 24. In the typical situation, the G.F.C.I. 42 reacts to a 5 milliamp or more ground fault wherein 5 milliamps or more current flows from line L1 to earth ground 46. In addition, if the circuit of FIG. 1 is configured for use with a 120 volt source alone, then the G.F.C.I. 42 shutting off current will cut off the current to the pump 20, the blower 22, the light 24 and the heaters 26.

Heaters 26 have additional safety controls within the circuit of FIG. 1. Specifically, pressure switch 48 will not allow heaters 26 to be turned on if there is no movement of water within the plumbing of the spa system. Thermostat 50 allows the user to preset a maximum temperature of the water in the spa and when the thermostat senses that the water temperature exceeds the preset maximum, it will cut off the electrical power to the heaters 26 via heater contactor 52. The typical absolute maximum preset temperature of the thermostat 50 is 104 degrees Fahrenheit to prevent hypothermia of the user. The heaters 26 are also controlled by high limit control switches 54 which will disconnect heaters 26 from electric power if the heater exceeds a specified temperature, typically more than 122 degrees Fahrenheit.

Thusfar described, the spa control circuit is conventional. It is noteworthy that despite use of various controls to ensure safety, and important source of overheating of the spa water has been overlooked and no safety means has been provided for control of this overlooked source. That is, the temperature limit switches used conventionally sense an overheated condition and shut down the heaters but since these switches do not control the pump the pump is free to continue running and experience has shown that the pump motor, particularly running at the high speed preferred by spa users is capable of continuing to heat the recirculating water well beyond the limits imposed on the heaters.

Thus, conventional control circuits for spas and swimming pools such as the circuit of FIG. 1 have attempted to prevent hyperthermia of the user, but they have failed to control superheating attributable to the recirculating pump.

If a spa or pool is adequately insulated and covered and the water pump 20 is in its high speed mode, even though the heaters 26 are not operating, the heat generated from convection heating by the pump 20 will elevate the temperature of the water in the spa beyond the maximum temperature allowed by the thermostat 50 and beyond safe operating temperatures. Because the thermostat 50 and high limit control switches 54 control current only to the heaters 26 and not the pump 20 in the conventional control system, there is no way of preventing the temperature of the water in the spa from climbing above safe levels on the continuing circulation of the water through the pump.

Referring now to FIG. 2, a portion of the circuit of FIG. 1 is reproduced modified by the addition of a preferred embodiment of the present invention.

As noted above the present invention overcomes the problem of not shutting down the pump in the case of an overshoot in temperature of the water, by a simple modification of the G.F.C.I. to induce a shutdown of power to the system including the pump as a simulated ground fault. Since the supply current for the pump 20, blower 22, light 24 and the time clock 32 in the circuit of FIG. 1 comes via the G.F.C.I. 42 and the open neutral relay 44, the present invention contemplates disconnecting this supply source when the temperature of the water in the spa system exceeds a selected safe temperature. Disconnecting this current source will shut off pump 20 and prevent pump 20 from increasing the temperature of the water. The selected safe temperature is typically one just above the maximum temperature allowed by thermostat 50 (FIG. 1).

The G.F.C.I. 42 will respond to a simulated fault condition by disconnecting its current source via open neutral relay 44. The simulated fault condition is preferably induced via thermostatic switch 60 and resistor 62 which create a flow of current from line L1 after it exits the G.F.C.I. 42 and the neutral line before it enters the G.F.C.I. 42. The thermostatic switch 60 can be of any conventional type and mounted to the housing of heaters 26 (FIG. 1). In the event the water temperature rises above the selected safe temperature, thermostatic switch 60 shorts and places resistor 62 between line L1 and the neutral line in advance of to the G.F.C.I. 42. Preferably, the value of resistor 62 is 15,000 ohms with a power rating of 2 watts, or other suitable value of resistance chosen to prevent excessive current being applied to the G.F.C.I. 42.

Thus, if the power line consisting of L1 and neutral are carrying at least 110 volts, resistor 62 will cause a current of at least 7.33 milliamps to flow from line L1 which is not returned via the neutral line exiting the G.F.C.I. 42. This causes the G.F.C.I. 42 to sense a ground fault condition, cause neutral relay 44 to open up its power line and this in turn causes the pump 20 to shut off.

The present invention has thus corrected a potentially dangerous high temperature risk in conventional spa and swimming pool control circuits.

The above description of the preferred embodiment of the present invention is for illustrative purposes only and is not to be considered as limiting the scope of the present invention. Instead, the scope of the present invention is determined by the following claims.

We claim:

1. In a pool or spa water heating system having an electrical power supply and in which water is continually recirculated by an electrically controlled pump through a heater under conditions allowing conventional heating of the water by said pump, said system having a ground fault circuit interrupter operatively connected to the pump electrical control for deactivating the pump when said interrupter senses a ground fault condition, the improvement comprising means simulating a ground fault condition to said interrupter responsive to a sensed overtemperature condition in the recirculating water for electrically disconnecting said pump and blocking pump heating said water by activation of said fault interrupter in response to the simulated ground fault condition.

2. Pool or water heating system according to claim 1, including also signaling means arranged to sense a overtemperature condition and signal said condition, and trip means responsive to said signal to cause a flow of current from said power supply sufficient to cause said fault interrupter to disconnect said pump from said power supply and discontinue water circulation.

3. The system according to claim 1, in which said power supply comprises a power line having a first power conductor and a neutral power conductor.

4. The system according to claim 1, in which said signaling means comprises a thermostatic switch in sensing relationship to said recirculating water and adapted to cause an electrical connection between its two poles in response to a sensed overtemperature condition.

5. The apparatus in accordance with claim 1, including also a trip means and in which said power supply includes a first power conductor and a neutral line, said fault interrupter acting to disconnect said pump from said first power conductor responsive to a predetermined imbalance in the current flowing from the first conductor and through the neutral line occurring; said trip means comprising a simulated fault current means drawing at least a minumum amount of current sufficient to effect said predetermined imbalance and cause the fault interrupter to disconnect said pump from said first power conductor.

6. The system according to claim 1, in which said ground fault simulating means comprises a resistor for resisting the flow of electrical current, said resistor being interconnected in series between said poles of said thermostatic switch and between the first power conductor and the neutral power conductor in a manner that when the thermostatic switch shorts between its two poles, the fault interrupter disconnects said pump from said first power conductor.

7. Pool or water heating system according to claim 1, including also signaling means arranged to sense a overtemperature condition and signal said condition, and trip means responsive to said signal to cause a flow of current from said power supply sufficient to cause said fault interrupter to disconnect said pump from said power supply and discontinue water circulation, said trip means comprising a simulated fault current means drawing at least a minimum amount of current sufficient to effect a current imbalance and cause the fault interrupter to disconnect said pump from said power supply.

8. The system according to claim 7, in which said power supply comprises a power line having a first power conductor and a neutral power conductor.

9. The system according to claim 8, in which said signaling means comprises a thermostatic switch in sensing relationship to said recirculating water and adapted to cause an electrical connection between its two poles in response to a sensed overtemperature condition.

10. The apparatus in accordance with claim 9, in which said power supply includes a first power conductor and a neutral line, said fault interrupter acting to disconnect said pump from said first power conductor responsive to a predetermined imbalance in the current flowing from the first conductor and through the neutral line occurring; said trip means comprising a simulated fault current means drawing at least a minimum amount of current sufficient to effect said predetermined imbalance and cause the fault interrupter to disconnect said pump from said first power conductor.

11. The system according to claim 10, in which said ground fault simulating means comprises a resistor for resisting the flow of electrical current, said resistor being interconnected in series between said poles of said thermostatic switch and between the first power conductor and the neutral power conductor in a manner that when the thermostatic switch shorts between its two poles, the fault interrupter disconnects said pump from said first power conductor.

* * * * *